US007713674B2

(12) United States Patent
Chen et al.

(10) Patent No.: US 7,713,674 B2

(45) Date of Patent: May 11, 2010

(54) EMULSION POLYMERIZATION PROCESS

(75) Inventors: Allan Kwok-Wai Chen, Oakville (CA); Milan Maric, Montreal (CA); Tie Hwee Ng, Mississauga (CA); George Liebermann, Mississauga (CA); Enno Eric Agur, Toronto (CA); Hadi Khan Mahabadi, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1146 days.

(21) Appl. No.: 11/223,639

(22) Filed: Sep. 9, 2005

(65) Prior Publication Data

US 2007/0059630 A1 Mar. 15, 2007

(51) Int. Cl.
*G03G 9/08* (2006.01)
*C08J 3/05* (2006.01)

(52) U.S. Cl. ............................ 430/137.14; 430/137.17; 524/556; 524/560; 524/561; 524/562; 524/575; 524/603; 524/609; 524/819; 524/820; 524/822; 524/824; 524/833; 524/836; 524/845

(58) Field of Classification Search ............ 430/137.17, 430/137.14, 137.15; 524/603, 845, 556, 524/575, 560, 561, 562, 819, 820, 822, 824, 524/833, 836, 609
See application file for complete search history.

(56) References Cited

U.S. PATENT DOCUMENTS 3,944,493 A 3/1976 Jadwin et al. .......... 430/108.21
4,007,293 A 2/1977 Mincer et al. ............ 430/111.1
4,079,014 A 3/1978 Burness et al. ......... 430/108.21
4,394,430 A 7/1983 Jadwin et al. ............ 430/108.2
4,560,635 A 12/1985 Hoffend .................. 430/108.2
5,278,020 A 1/1994 Grushkin ................. 430/109.3
5,290,654 A 3/1994 Sacripante ............. 430/137.14
5,308,734 A 5/1994 Sacripante ............. 430/137.14
5,344,738 A 9/1994 Kmiecik-Lawrynowicz et al. ..................... 430/137.14
5,346,797 A 9/1994 Kmiecik-Lawrynowicz et al. ..................... 430/137.14
5,348,832 A 9/1994 Kmiecik-Lawrynowicz et al. ..................... 430/137.14
5,364,729 A 11/1994 Kmiecik-Lawrynowicz et al. ..................... 430/137.14
5,366,841 A 11/1994 Patel et al. ............. 430/137.14
5,370,963 A 12/1994 Patel et al. ............. 430/137.14
5,403,693 A 4/1995 Patel et al. ............. 430/137.14
5,405,728 A 4/1995 Hopper et al. ......... 430/137.14
5,418,108 A 5/1995 Kmiecik-Lawrynowicz et al. ..................... 430/137.14
5,496,676 A 3/1996 Croucher et al. ....... 430/137.14
5,501,935 A 3/1996 Patel et al. ............. 430/137.14
5,527,658 A 6/1996 Hopper et al. ......... 430/137.14
5,585,215 A 12/1996 Ong ........................ 430/108.2
5,648,193 A 7/1997 Patel et al. ............. 430/137.14
5,650,255 A 7/1997 Ng et al. ................ 430/137.14
5,650,256 A 7/1997 Veregin et al. ......... 430/137.14
5,658,704 A 8/1997 Patel et al. ............. 430/137.19
5,660,965 A 8/1997 Mychajlowskij et al. ..................... 430/137.14
5,684,063 A 11/1997 Patel et al. .................. 523/161
5,723,253 A 3/1998 Higashino et al. ........... 430/166
5,744,520 A 4/1998 Kmiecik-Lawrynowicz et al. ........................... 523/334
5,747,215 A 5/1998 Ong et al. .............. 430/137.14
5,763,133 A 6/1998 Ong et al. .............. 430/137.14
5,766,818 A 6/1998 Smith et al. ............ 430/137.17
5,804,349 A 9/1998 Ong et al. .............. 430/109.31
5,827,633 A 10/1998 Ong et al. .............. 430/137.14
5,840,462 A 11/1998 Foucher et al. ......... 430/137.14
5,853,944 A 12/1998 Foucher et al. ......... 430/137.14
5,869,215 A 2/1999 Ong et al. .............. 430/137.14
5,916,725 A 6/1999 Patel et al. ............. 430/137.14
5,945,245 A 8/1999 Mychajlowskij et al. ..................... 430/137.14
5,977,210 A 11/1999 Patel et al. .................. 523/161
6,020,101 A 2/2000 Sacripante et al. ....... 430/110.2
6,143,457 A 11/2000 Carlini et al. ............ 430/108.2
6,203,961 B1 3/2001 Pan ............................ 430/114
6,348,561 B1 2/2002 Mychajlowskij et al. .... 528/288
6,458,501 B1 10/2002 Cheng et al. ................ 430/135
6,541,175 B1 4/2003 Jiang et al. ............. 430/137.14
6,664,015 B1 12/2003 Sacripante ............... 430/108.1
6,818,723 B2 11/2004 Sacripante .................... 528/26
2003/0232268 A1* 12/2003 Sacripante et al. ..... 430/137.14

* cited by examiner

*Primary Examiner*—Janis L Dote
(74) *Attorney, Agent, or Firm*—Marylou J. Lavoie, Esq. LLC

(57) ABSTRACT

An emulsion polymerization process comprising polymerizing monomer in an emulsion in a reaction vessel at a first temperature to form a resin; cooling the reaction vessel to a second temperature that is above the softening point of the resin yet below the temperature required for significant depolymerization reaction to occur; and adding water to the cooled reaction vessel in an amount sufficient to effect phase inversion with mixing for a sufficient time to form an aqueous latex emulsion in the absence of a surfactant.

22 Claims, No Drawings

EMULSION POLYMERIZATION PROCESS

TECHNICAL FIELD

The present disclosure relates generally to an emulsion polymerization process and to a method for preparing emulsion aggregation toners using a latex formed by the emulsion polymerization process. The aforementioned toners are especially useful for imaging processes.

BACKGROUND

As a method of making toner particles, a method employing the use of emulsion polymerization to form the toner resin binder is known. Emulsion polymerization comprises forming an emulsion of a surfactant and monomer in water, then polymerizing the monomer in the presence of a water soluble initiator. Emulsion polymerization is a well known industrial process. In forming toner compositions for use with reprographic or xerographic print devices, emulsion aggregation processes are known. For example, emulsion/aggregation/coalescing processes for the preparation of toners are illustrated in a number of Xerox patents, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832, 5,405,728, 5,366,841, 5,496,676, 5,527,658, 5,585,215, 5,650,255, 5,650,256, 5,501,935, 5,723,253, 5,744,520, 5,763,133, 5,766,818, 5,747,215, 5,827,633, 5,853,944, 5,804,349, 5,840,462, and 5,869,215, the disclosures of each of which are totally incorporated herein by reference.

In addition, the following U.S. patents relate to emulsion aggregation processes of forming toner compositions, the disclosures of each of which are totally incorporated herein by reference in their entireties:

U.S. Pat. No. 5,945,245 describes a surfactant free process for the preparation of toner comprising heating a mixture of an emulsion latex, a colorant, and an organic complexing agent.

U.S. Pat. No. 5,977,210 describes a process for the preparation of ink compositions comprising the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding additional anionic surfactant to stabilize the aggregate particles.

U.S. Pat. No. 6,458,501 describes a process for making silica-containing latex particles involves polymerizing monomer in an emulsion comprising the monomer, water, silica particles, and optionally at least one surfactant, by adding at least one free radical initiator to the emulsion to form the silica-containing latex particles.

The appropriate components and process aspects of the each of the foregoing U.S. patents may be selected for the present compositions and processes in embodiments thereof.

Generally, sulfonated polyester (SPE) resins for emulsion/aggregation (EA) toner have been made by bulk polycondensation reactions in a reaction vessel followed by discharge from the reaction vessel. When the desired molecular weight/viscosity is obtained, the viscous resin is discharged into drums and cooled. The SPE resin is then crushed and milled before being dissipated into water at elevated temperatures (for example, about 80° C. to about 150° C.) to form the latex, given that the resin has sufficient sulfonated monomer to dissipate readily. The resulting latex is mixed with pigments, wax and other additives to form toner particles. Current processes have a number of disadvantages: 1) The resin may become so viscous that discharge may be difficult, if not impossible. This is especially important for branched resins. 2) The reactor needs to be cleaned with solvent to remove any residual resin. 3) The crushing/grinding step is labor-intensive. 4) Resins with lower sulfonation levels, such as, for example, resins that are about 0.5% to about 3.75% sulfonated, cannot be readily dissipated into water without the aid of surfactants or co-solvents.

There remains a need for an improved emulsion polymerization process for preparing polyester resins. There further for an improved method for preparing emulsion aggregation toners wherein the latex is formed by emulsion polymerization.

SUMMARY

Provided are emulsification processes with many of the advantages illustrated herein. Further provided is a streamlined method for the preparation of polyester latex resin comprising a process for emulsifying polyester resins directly inside the reaction vessel, for example, in situ emulsification of sulfonated polyester resins. The process comprises, for example, emulsion polymerization in a reaction vessel to form a polyester resin and introducing hot water into the reaction vessel prior to discharge (rather than discharging the high viscosity polyester resin and then emulsifying in water) to provide an aqueous latex emulsion.

Aspects illustrated herein relate to a process comprising polymerizing monomer in an emulsion at a first temperature to form a resin, cooling to a second temperature that is above the softening point of the resin yet below the temperature required for significant depolymerization reaction to occur; and adding water in an amount sufficient to effect phase inversion with mixing to form an aqueous latex emulsion in the absence of a surfactant.

Aspects illustrated herein relate to a process comprising polymerizing monomer in an emulsion in a reaction vessel at a first temperature to form a resin; cooling the reaction vessel to a second temperature that is above the softening point of the resin yet below the temperature required for significant depolymerization reaction to occur; and adding water to the cooled reaction vessel in an amount sufficient to effect phase inversion with to form an aqueous latex emulsion in the absence of a surfactant.

Further aspects illustrated herein relate to a process for preparing toner comprising polymerizing monomer in an emulsion in a reaction vessel at a first temperature to form a resin; cooling the reaction vessel to a second temperature that is above the softening point of the resin yet below the temperature required for significant depolymerization reaction to occur; adding water to the cooled reaction vessel in an amount sufficient to effect phase inversion with mixing to form an aqueous latex emulsion in the absence of a surfactant; aggregating a colorant with the aqueous latex emulsion; and coalescing or fusing the aggregates to form toner particles.

Aspects described herein further relate to a process for the preparation of toner comprising blending a colorant, with the latex emulsion of the process of claim 1 and optionally with one or a combination of flocculant and charge additives; heating the resulting flocculent mixture at a temperature below the glass transition temperature of the latex polymer, for an effective length of time to form toner sized aggregates; subsequently heating the aggregate suspension at a temperature at or above the glass transition temperature of the latex polymer to effect coalescence or fusion, thereby providing toner particles; optionally, isolating the toner product; and optionally, washing and drying the toner particles.

The in situ emulsification of sulfonated polyester resins overcomes or eliminates many of the problems associated with current processes for forming sulfonated polyester resins. Once the desired polymerization end-point is reached, the reactor is cooled to a temperature above the softening point of the resin but below the temperature required for significant reaction. The molten resin is mixed while adding hot water, for example water at about 70° C. to about 150° C., or about 80° C. to about 140° C., or about 90° C. to about 100° C., without the aid of any intensive auxiliary mixing equipment such as in-line homogenizers and the like. Water is added in an amount sufficient to effect phase inversion and achieve an about 30% to about 40% emulsion of resin in water. For example, water can be selected in an amount sufficient to achieve about 5% to about 70% emulsion of resin in water (for example, about 5% resin by weight to about 70% resin by weight with the remainder being water.) Further, for example, water can be selected in an amount sufficient to achieve about 5% emulsion of resin to about 40% emulsion of resin in water. The resulting stable latex is then able to be easily discharged since the continuous phase is aqueous.

Advantageously, the reactor does not need to be cleaned of residual resin since the resin has all or substantially all dissipated into the aqueous phase. Preparing the latex resin in situ at the end of the polycondensation by addition of hot water, eliminates the requirement for an intensive crushing/milling step. A further advantage is that the resin can be stored as an emulsion.

The process enables preparation of latex resins having lower sulfonation levels than could otherwise be done unless co-solvents and/or surfactants are used. The process is advantageous for resins requiring lower sulfonation to improve toner triboelectric charging properties. The process enables emulsification of resins with lower sulfonation levels than that which is easily emulsifiable (less than about 3.5% sulfonated monomer) by previous processes. For example, the process enables emulsification of resins having a sulfonation level of about 0.5% to about 5.0% sulfonated monomer or about 1.5% to about 3.75% or less than about 3.5% sulfonated monomer.

The reactor cleaning step is simplified since solvents are not needed to clean out the reactor. The emulsification process is "self-cleaning" since no resin residue is left in the reactor. The reactor is essentially free of residual resin. The process enables a resin yield of greater than about 98%.

Discharge of the emulsion is easy due to the low viscosity of the continuous aqueous phase. Previously, the discharge of highly viscous resins such as branched sulfonated polyester (BSPE) was difficult.

Particle sizes of about one micron can be achieved for a wide range of resin softening points. No surfactants, co-solvents or other auxiliary equipment are needed to emulsify the resins, despite the ability to achieve low sulfonation levels and resins having various viscosities.

These and other features and advantages will be more fully understood from the following description of certain specific embodiments taken together with the accompanying claims.

DESCRIPTION

An emulsion polymerization process comprises polymerizing monomer in an emulsion in a reaction vessel at a first temperature, for example about 25° C. to about 280° C., about 35° C. to about 125° C., about 100° C. to about 280° C., about 170° C. to about 280° C., or about 190° C. to about 220° C., to form a resin; cooling the reaction vessel to a second temperature that is above the softening point or melting temperature of the resin yet below the temperature required for significant depolymerization reaction to occur; and adding water to the cooled reaction vessel in an amount sufficient to effect phase inversion with mixing to form an aqueous latex emulsion. The process takes advantage of the molten resin being hot and molten in the reactor right after the polymerization process, adding hot water into the same reaction vessel to form a latex emulsion without the occurrence of significant depolymerization. For example, polymer depolymerization can be indicated by a decrease in measured resin molecular weight (Mw) for example as measured by Gel Permeation Chromatography (GPC). GPC can be used to detect if a resin has been degraded by employing GPC to measure resin Mw before and after the experiment. In this context, a significant depolymerization can be, for example, greater than about a 30% decrease in Mw. An acceptable degree of depolymerization can be, for example, a measured decrease in resin Mw of less than about 30% or less than about 20% at the end of the experiment for a particular resin. In embodiments, a Mw of a resin after in situ emulsification can be, for example, in the range of from about 5 kilograms per mol to about 50 kilograms per mol. The second temperature can be selected, for example, at about 70° C. to about 150° C. or about 80° C. to about 140° C. Adding water can be, for example, adding water at a temperature of a bout 70° C. to about 150° C. or about 90° C. to about 100° C.

One or more monomers can be used to form an aqueous latex emulsion in the present process. Any suitable monomer or monomers may be used. Monomers useful in the present process include, but are not limited to, acrylic and methacrylic esters, styrene, vinyl esters of aliphatic acids, ethylenically unsaturated carboxylic acids and known crosslinking agents. Suitable ethylenically unsaturated carboxylic acids can be, for example, acrylic acid, methacrylic acid, itaconic acid, maleic acid, fumaric acid, 2-carboxyethyl acrylate (beta-CEA), and the like. A combination of monomers can be used, for example, styrene, n-butyl acrylate and/or beta-CEA.

Further, a branched amorphous resin can be selected for the present process. In embodiments, the branched amorphous resin can be a sulfonated polyester, for example, an alkali sulfonated polyester resin. Examples of suitable alkali sulfonated polyester resins include, but are not limited to, the metal or alkali salts of copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly (ethoxylated bisphenol-A-5-sulfo-isophthalate), and wherein the alkali metal is, for example, a sodium, lithium or potassium ion.

The branched amorphous polyester resin, in embodiments, can possess, for example, a number average molecular weight (Mn), as measured by gel permeation chromatography (GPC), of from about 10,000 to about 500,000, or from about 5,000 to about 250,000; a weight average molecular weight (Mw) of, for example, from about 20,000 to about 600,000, or from about 7,000 to about 300,000, as determined by gel permeation chromatography using polystyrene standards;

and wherein the molecular weight distribution (Mw/Mn) is, for example, from about 1.5 to about 6, and more specifically, from about 2 to about 4. The onset glass transition temperature (Tg) of the resin as measured by a differential scanning calorimeter (DSC) is, in embodiments, for example, from about 55° C. to about 70° C., and more specifically, from about 55° C. to about 67° C.

The branched amorphous polyester resins are generally prepared by the polycondensation of an organic diol, a diacid or diester, a sulfonated difunctional monomer, and a multivalent polyacid or polyol as the branching agent and a polycondensation catalyst.

Examples of diacid or diesters selected for the preparation of amorphous polyesters include dicarboxylic acids or diesters selected from the group consisting of terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester can be selected, for example, from about 45 to about 52 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected can vary, and more specifically, is, for example, from about 45 to about 52 mole percent of the resin.

The monomers are mixed with water to form an emulsion. The emulsification is generally accomplished at a temperature (that is, first temperature) selected in accordance with the particular monomers. For example, a first temperature can be about 5° C. to about 40° C. or about 20° C. to about 25° C. The emulsion may also be formed at higher temperatures, in particular, about 5° C. to about 280° C., about 100° C. to about 280° C., about 170° C. to about 280° C., or about 190° C. to about 220° C. To form an emulsion, the mixture is generally agitated at, for example, at least 100 revolutions per minute (rpm), or at least 400 rpm, for sufficient time to form an emulsion in the absence of a surfactant.

A chain transfer agent is typically added to the monomer emulsion to control the molecular weight properties of the polymer to be formed. Chain transfer agents that can be selected for the present processes include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chan transfer agents can be used in any effective amount, such as from about 0.1 to about 10 percent by weight of the monomer in the monomer emulsion.

A polymerization initiator can be mixed with at least a portion of the monomer emulsion to form seed polymer for example a free radical initiator that attaches to the polymer forming ionic, hydrophilic end groups on the polymer. The presence of these ionic, hydrophilic end groups on the polymer stabilizes the latex. The stability results from the electrostatic repulsion of the charged groups on a given latex particle with respect to those on the other particles. Suitable initiators include, but are not limited to, ammonium persulfate, potassium persulfate, sodium persulfate, ammonium persulfite, potassium persulfite, sodium persulfite, ammonium bisulfate, sodium bisulfate, 1,1'-azobis(1-methylbutyronitrile-3-sodium sulfonate), and 4,4'-azobis(4-cyanovaleric acid). The initiator can be a persulfate initiator such as ammonium persulfate, potassium persulfate, sodium persulfate, and the like. The initiator is generally added as part of an initiator solution in water.

The amount of initiator used to form the latex polymer is generally from about 0.1 to about 10 percent by weight of the monomer to be polymerized. From about 5 percent to about 100 percent by weight, or from about 30 percent to about 100 percent by weight, of the total amount of initiator to be used to prepare the latex polymer is added during the seed polymerization stage.

In forming the seed polymer, the initiator is generally added to the emulsion fairly slowly in order to maintain the stability of the system. For example, the initiator is added over the course of at least 5 minutes, or over the course of at least 10 minutes.

Additional monomer is then added to the seed polymer to complete the polymerization. The emulsion polymerization is generally conducted in a reaction vessel at a first temperature sufficient to form a resin with the first temperature being selected in accordance with the resin, such as a temperature of from about 25° C. to about 280° C. For example, for styrene/acrylate latex polymerization, a first temperature range can be selected that is generally lower than a selected first temperature range for polyester polymerization. A first temperature for a styrene/acrylate polymerization can be, for example, about 35° C. to about 125° C. For polyester polymerization, at a first temperature can be selected, for example, of about 170° C. to 280° C. or about 190° C. to about 220° C.

The additional monomer is generally fed to the composition at an effective time period of, for example, about 05 to about 10 hours or about 2 to about 6 hours. The additional monomer may be in the form of a monomer emulsion. In particular, the monomer may be the remainder of the monomer emulsion used to form the seed polymer after a portion is removed to form the seed polymer.

In addition, additional initiator can optionally be added after the seed polymerization. If additional initiator is added during this phase of the reaction, it may or may not be of the same type as the initiator added to form the seed polymer. The initiator is, in embodiments, a free radical initiator. Initiators useful during this step of the process include, but are not limited to, the above-mentioned initiators as well as hydrogen peroxide, t-butyl hydroperoxide, cumene hydroperoxide, paramethane hydroperoxide, benzoyl peroxide, tert-butyl peroxide, cumyl peroxide, 2,2'-azobisisobutyronitrile, 2,2'-azobis(2-methylbutyronitrile), 2,2'-azobis(2-amidinopropane)dihydrochloride, 2,2'-azobisisobutyl amide dehydrate, 2,2'-azobis[2-(2-imidazolin-2-yl)propane]dihydrochloride, and 2,2'-azobis[2-(5-methyl-2-imidazolin-2-yl)propane]dihydrochloride.

When the desired end point is reached, as determined for example by softening point or viscosity, the reaction vessel is cooled to a second temperature that is above the softening point of the resin yet below the temperature required for significant depolymerization reaction to occur. Water is added to the cooled reaction vessel in an amount sufficient to effect phase inversion with mixing to form an aqueous latex emulsion. The second temperature can be, for example, about 70° C. to about 150° C. or about 80° C. to about 140° C.

Resins prepared via the process include, for example, but are not limited to, polyester, sulfonated crystalline polyester (SCPE) and sulfonated amorphous polyesters, for example, linear sulfonated polyester (SPE) and branched sulfonated polyester (BSPE). Further illustrative examples of latex polymers that may be formed by the process include, but are not limited to, known polymers such as poly(styrene-butadiene), poly(methyl methacrylate-butadiene), poly(ethyl methacrylate-butadiene), poly (propyl methacrylate-butadiene), poly (butyl methacrylate-butadiene), poly(methyl acrylate-butadiene), poly(ethyl acrylatebutadiene), poly (propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly (styrene-butadiene), poly(styrene-isoprene), poly(styrene-butyl methacrylate), poly (styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl arylate-acrylic acid), and the like.

The following examples are set forth as representative of the present disclosure. These examples are not to be construed as limiting the scope of the disclosure as these and other equivalent embodiments will be apparent in view of the present disclosure and accompanying claims.

EXAMPLES

In situ emulsification of sulfonated polyester resins was performed in the same reactor as the bulk polycondensation polymerization. A 2 liter by volume stainless steel reactor (Hoppes) with an anchor-blade impeller was used to prepare various crystalline polyester and branched polyester resins via the in situ emulsification process. These resins, having varying softening points and sulfonation levels, were used to test the robustness of the process (see Table 1). The resins included are sulfonated crystalline polyester (SCPE), linear sulfonated polyester (SPE) and branched sulfonated polyester (BSPE).

Examples 1-6 having the following compositions and having the softening points and percentage of sulfonated monomers shown in Table 1 were prepared.

Example 1

48.46 mol % sebacic acid, 1.52 mole % 5-sodio-sulfo-dimethyl terephthalate, 49.98 mol % ethylene glycol, 0.04 mol % butylstannoic acid (catalyst).

Example 2

46.50 mol % sebacic acid, 3.48 mol % lithio sulfo-isophthalic acid, 49.98 mol % ethylene glycol, 0.04 mol % butylstannoic acid (catalyst).

Example 3

48.33 mol % dimethyl terephthalate, 1.63 mol % 5-sodio-sulfo-dimethyl terephthalate, 0.56 mol % trimethylopropane, 2.45 mol % diethylene glycol, 39.02 mol % propylene glycol, 7.97 mol % dipropylene glycol, 0.04 mole % butylstannoic acid (catalyst).

Example 4

47.79 mol % dimethyl terephthalate, 2.18 mol % lithio-sulfo-isophthalic acid, 0.56 mol % trimethylopropane, 2.45 mol % diethylene glycol, 39.02 mol % propylene glycol, 7.97 mol % dipropylene glycol, 0.04 mole % butylstannoic acid (catalyst).

Example 5

46.96 mol % dimethyl terephthalate, 3.00 mol % lithio sulfo-isophthalic acid, 0.51 mol % trimethylopropane, 2.13 mol % diethylene glycol, 42.21 mol % propylene glycol, 5.13 mol % dipropylene glycol, 0.06 mol % butylstannoic acid (catalyst).

Example 6

46.21 mol % dimethyl terephthalate, 3.77 mol % 5-sodio-sulfo-dimethyl terephthalate, 6.69 mol % diethylene glycol, 33.08 mol % propylene glycol, 10.20 mol % dipropylene glycol, 0.06 mol % butylstannoic acid (catalyst).

TABLE 1

| Resin Example # | Softening point (° C.) | % sulfonated monomer |
|---|---|---|
| 1 | <90 | 1.5 |
| 2 | <90 | 3.0* |
| 3 | 161.9 | 1.5 |
| 4 | 165 | 2.0* |
| 5 | 152.0 | 3.0* |
| 6 | 148.9 | 3.75 |

*indicates that lithio-sulfonated monomer was used instead of sodio-sulfonated monomer The polymerization can be performed with various glycols and methyl esters. For example, U.S. Pat. Nos. 6,818,723 and 6,664,015 describe a process for making sulfonated polyester-siloxane resin, U.S. Pat. Nos. 6,541,175, 5,853,944, 5,840,462, 5,660,965, 5,658,704, and 5,648,193 describe the synthesis of toner processes, U.S. Pat. No. 6,348,561 describes a process for sulfonated polyester amine resins, U.S. Pat. No. 6,203,961 describes a developer composition and processes, U.S. Pat. Nos. 6,143,457, 5,348,832, and 6,020,101 describe toner compositions and process thereof, U.S. Pat. No. 5,916,725 describes surfactant free toner processes, U.S. Pat. No. 5,684,063 describes an ink process, the disclosures of each of which are totally incorporated by reference herein.

The reactor temperature during the polycondensation step was about 100° C. to about 230° C. and about 1.0 kg of polymer was obtained for each Example 1-6. When the desired end-point was reached as determined by softening point or viscosity, the reactor was cooled to about 150° C. while still maintaining mixing. Agitation in the 2 liter Hoppes reactor was maintained at about 50 revolutions per minute (RPM). 1 liter of water was heated to about 80° C. to about 150° C. and charged into a stainless steel cylinder using vacuum. The stainless steel cylinder containing the water was equipped with needle valves at both ends. Minutes prior to the in situ emulsification step, one end of the stainless steel cylinder was connected to a nitrogen supply and the other end was connected to the charge port of the reactor. The reactor was placed under a full vacuum and the needle valve was opened. The water contained in the stainless steel cylinder required a slight nitrogen pressure applied to facilitate transfer of the liquid. The reactor temperature quickly dropped to about 90° C. to about 100° C. and was maintained at the temperature. For branched polyester resin emulsification, the temperature can be about 120° C. to about 140° C. The mixture became paste-like. Additional water heated at about 90° C. to about 100° C. was added to obtain a solids loading of about 30% by weight based upon the total weight of the mixture, e.g. polyester resin plus the water added. Mixing was continued for an additional 3 hours at the required temperatures for the particular resin example as one of skill in the art could readily determine. The bottom valve was then opened with an emulsion having a milk-like consistency exiting. About 2.5 liters of emulsion was collected for each example. Samples were taken for solids and particle size. An additional sample was dried and the polymer residue submitted for GPC (gel permeation chromatography) to determine if any de-polymerization occurred at the elevated temperatures. The same procedure was repeated for each resin Example 1-6.

An example of BSPE results is shown in Table 2 for Example #5.

TABLE 2

| Example # | Desired % Solids Loading | Actual % Solids Loading | Mean Particle Size (nanometers) | Mw resin, before (kg/mol) | Mw resin, after (kg/mol) |
|---|---|---|---|---|---|
| Example #5 from Table 1 | 5 to 25 | 18.6 | 944 | 8.6 | 7.3 |

An examination of the reactor after discharge of the BSPE and CPE emulsifications showed very little to no residual resin inside the reactor and cleaning the reactor with solvents was not necessary. The cleanliness of the agitator and walls were particularly noted. The emulsions formed remained stable for several weeks, based on particle size measurements. The emulsions could be stored as the 30% concentrate or diluted further with water to a desired solids loading.

In embodiments, the present process is directed to processes for the preparation of toner comprising blending a colorant, such as a colorant dispersion, for example a colorant dispersion containing a pigment, such as carbon black, phthalocyanine, quinacridone or RHODAMINE B™ type, with a latex emulsion prepared as illustrated herein and optionally with a flocculant and/or charge additives; heating the resulting flocculent mixture at a temperature below the Tg (glass transition temperature) of the latex polymer, for an effective length of time of, for example about 0.5 hour to about 2 hours, to form toner sized aggregates; subsequently heating the aggregate suspension at a temperature at or above the Tg of the latex polymer, for example from about 60° C. to about 120° C., to effect coalescence or fusion, thereby providing toner particles; and isolating the toner product, such as by filtration, thereafter optionally washing and drying the toner particles, such as in an oven, fluid bed dryer, freeze dryer, or spray dryer.

The latex polymer is generally present in the toner compositions in various effective amounts, such as from about 75 weight percent to about 98 weight percent of the toner, and the latex polymer size suitable for the present processes can be, for example, from about 0.05 micron to about 1 micron in volume average diameter as measured by the Brookhaven nanosize particle analyzer. Other sizes and effective amounts of latex polymer may be selected in embodiments.

Colorants include pigments, dyes and mixtures of pigments with dyes and the like. The colorant is generally present in the toner in an effective amount of, for example, from about 1 to about 15 percent by weight of toner, or more specifically in an amount of from about 3 to about 10 percent by weight of the toner.

Illustrative examples of colorants, such as pigments, that may be used in the present processes include, but are not limited to, carbon black, such as REGAL 330™, magnetites, such as Mobay magnetites MO8029™, MO8060™, Columbian magnetites, MAPICO BLACKS™ and surface treated magnetites, Pfizer magnetites CB4799™, CB5300™, CB5600™, MCX6369™, Bayer magnetites, BAYFERROX 8600™, 8610™, Northern Pigments magnetites, NP-604™, NP-608™, Magnox Incorporated magnetites TMB-100™ or TMB-104™, and the like. Colored pigments or dyes, including cyan magenta, yellow, red green brown, blue and/or mixtures thereof, may also be used. Generally, cyan magenta, or yellow pigments or dyes, or mixtures thereof, are used.

Specific examples of pigments include, but are not limited to, phthalocyanine, HELIOGEN BLUE L6900™, D6840™, D7080™, D7020™, PYLAM OIL BLUE™, PYLAM OIL YELLOW™, PIGMENT BLUE 1™ Available from Paul Uhlich & Company, Inc., PIGMENT VIOLET 1™, PIGMENT RED 48™, LEMON CHROME YELLOW DCC 1026™, E.D. TOLUIDINE RED™, and BON RED C™, available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra (octadecyl sulfonamide) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the present processes.

Flocculants may be used in effective amounts of, for example, from about 0.01 percent to about 10 percent by weight of the toner. Flocculants that may be used include, but are not limited to, polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridiniumbromide, $C_{12}$,$C_{15}$,$C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like.

Charge additives may also be used in suitable effective amounts of, for example, from 0.1 to 5 weight percent by weight of the toner. Suitable charge additives include, but are not limited to, alkyl pyridinium halides, bisulfates, the charge control additives of U.S. Pat. Nos. 3,944,493; 4,007,293; 4,079,014; 4,394,430, and 4,560,635, the disclosure of which are totally incorporated herein by reference, negative charge enhancing additives like aluminum complexes, and the like.

Some of the advantages of the in situ emulsification process for sulfonated polyester resins demonstrated include: (1) Emulsifying the resin directly in the reactor right after the synthesis is completed eliminates the labor intensive crushing and grinding step. (2) Discharge of the emulsion is easy due to the low viscosity of the continuous aqueous phase. Previously, the discharge of highly viscous resins such as branched sulfonated polyester (BSPE) was difficult. (3) Particle sizes around one micron can be achieved for wide range of resin softening points. (4) No surfactants, co-solvents or other auxiliary equipment are needed to emulsify the resins, despite the low sulfonation levels and various viscosities of many of the resins. (5) Reactor cleaning was simplified and no solvents were needed. The process is self-cleaning. No residual resin was left in the reactor and the process yields can be greater about 98%.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A process comprising:

polymerizing monomer in an emulsion at a first temperature to form a resin;

cooling to a second temperature that is above the softening point of the resin yet below the temperature required for significant depolymerization reaction to occur; and adding water in an amount sufficient to effect phase inversion with mixing to form an aqueous latex emulsion in the absence of a surfactant.

2. The process of claim 1, wherein the first temperature is about 25° C. to about 280° C.

3. The process of claim 1, wherein the first temperature is about 190° C. to about 220° C.

4. The process of claim 1, wherein the second temperature is about 70° C. to about 150° C.

5. The process of claim 1, wherein the second temperature is about 80° C. to about 140° C.

6. The process of claim 1, wherein adding water is accomplished at a temperature of about 70° C. to about 150° C.

7. The process of claim 1, wherein adding water is accomplished at a temperature of about 90° C. to about 100° C.

8. The process of claim 1, wherein the aqueous latex emulsion comprises about 0.5 mol % to about 5 mol % sulfonated monomer.

9. The process of claim 1, wherein the aqueous latex emulsion comprises about 1.5 mol % to about 3.75 mol % sulfonated monomer.

10. The process of claim 1, wherein the aqueous latex emulsion comprises linear sulfonated polyester, branched sulfonated polyester, or sulfonated crystalline polyester.

11. The process of claim 1, wherein the aqueous latex emulsion comprises linear sulfonated polyester, branched sulfonated polyester, sulfonated crystalline polyester, poly (styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylatebutadiene), poly (propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly (styrene-butadiene), poly(styrene-isoprene), poly(styrene-butyl methacrylate), poly (styrene-butyl acrylate-acrylic acid), poly(styrene-butadiene-acrylic acid), poly (styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), or poly(acrylonitrile-butyl arylate-acrylic acid).

12. A process for preparing toner comprising:

polymerizing monomer in an emulsion in a reaction vessel at a first temperature to form a resin;

cooling the reaction vessel to a second temperature that is above the softening point of the resin yet below the temperature required for significant depolymerization reaction to occur;

adding water to the cooled reaction vessel in an amount sufficient to effect phase inversion with mixing to form an aqueous latex emulsion in the absence of a surfactant;

aggregating a colorant with the aqueous latex emulsion;

coalescing or fusing the aggregates to form toner particles.

13. The process of claim 12, wherein the aqueous latex emulsion comprises about 0.5 mol % to about 5 mol % sulfonated monomer.

14. The process of claim 12, wherein the aqueous latex emulsion comprises about 1.5 mol % to about 3.75 mol % sulfonated monomer.

15. The process of claim 12, wherein the aqueous latex emulsion comprises linear sulfonated polyester, branched sulfonated polyester, or sulfonated crystalline polyester.

16. The process of claim 12, wherein the aqueous latex emulsion comprises linear sulfonated polyester, branched sulfonated polyester, sulfonated crystalline polyester, poly (styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylatebutadiene), poly (propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly (styrene-butadiene), poly(styrene-isoprene), poly(styrene-butyl methacrylate), poly (styrene-butyl acrylate-acrylic acid), poly(styrene-butadiene-acrylic acid), poly (styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), or poly(acrylonitrile-butyl arylate-acrylic acid).

17. The process of claim 12, wherein the first temperature is about 25° C. to about 280° C.

18. The process of claim 12, wherein the first temperature is about 190° C. to about 220° C.

19. The process of claim 12, wherein the second temperature is about 70° C. to about 150° C.

20. The process of claim 12, wherein the second temperature is about 80° C. to about 140° C.

21. The process of claim 12, wherein adding water is accomplished at a temperature of about 70° C. to about 150° C.

22. The process of claim 12, wherein adding water is accomplished at a temperature of about 90° C. to about 100° C.

* * * * *